UNITED STATES PATENT OFFICE.

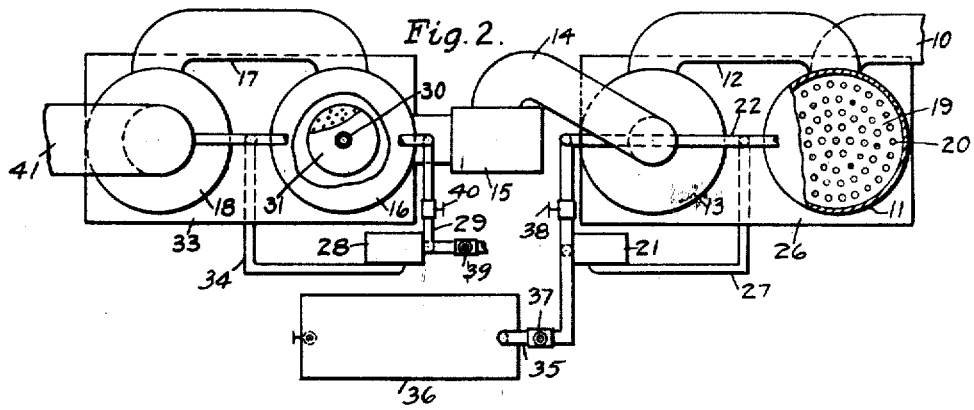
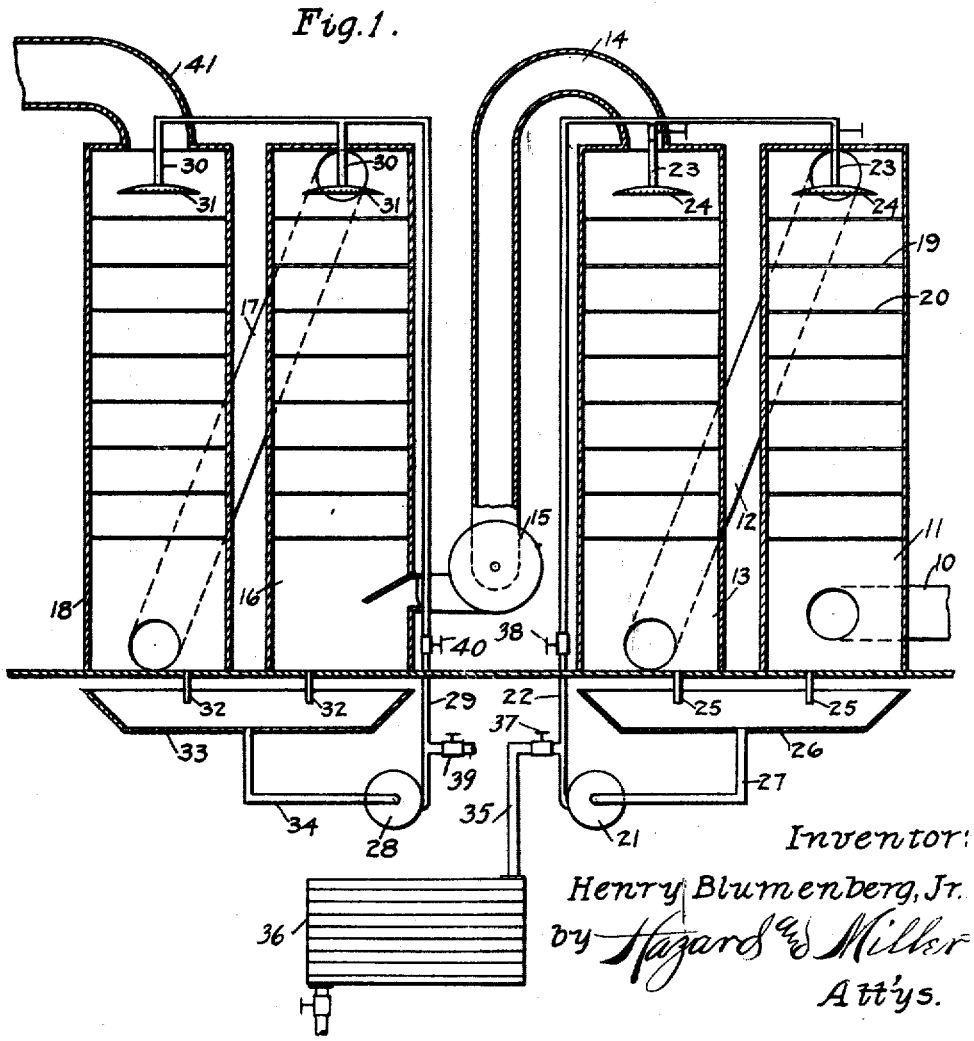

HENRY BLUMENBERG, JR., OF ORO GRANDE, CALIFORNIA.

PROCESS OF RECOVERING POTASSIUM COMPOUNDS FROM WASTE GASES OF CEMENT-KILNS AND THE LIKE.

1,296,463.     Specification of Letters Patent.     Patented Mar. 4, 1919.

Application filed March 15, 1918. Serial No. 222,767.

*To all whom it may concern:*

Be it known that I, HENRY BLUMENBERG, Jr., a citizen of the United States, residing at Oro Grande, in the county of San Bernardino and State of California, have invented new and useful Improvements in Processes of Recovering Potassium Compounds from Waste Gases of Cement-Kilns and the like, of which the following is a specification.

My invention relates to a process of recovering potassium compounds carried by hot gases and especially gases from a cement kiln.

At the present time potassium salts are produced as any product of cement kilns. Feldspar and other potassium containing materials are used in the manufacture of cement. The high temperature of the cement kiln volatilizes the potassium compounds which mixed with cement dust is carried off by the hot gases.

It is an object of the present invention to provide a process whereby substantially all the cement dust and approximately one-half of the potassium compounds are precipitated and the waste gases now practically free from cement dust, but containing the remaining portions of the potassium compounds, are subjected to a simple treatment whereby the remaining potassium compounds in the gases are recovered in the form of substantially pure potassium salts.

My invention consists in the steps of the process hereinafter described and claimed.

In the accompanying drawings which form a part of this specification, I have illustrated an apparatus suitable for carrying out my process, said apparatus being shown and claimed in my copending application for an apparatus for recovering potash from cement kilns, Serial No. 222,766, filed March 15, 1918, and in which:

Figure 1 is a vertical section thereof.

Fig. 2 is a top plan view thereof, some parts being shown as broken away for purposes of clearer illustration.

10 indicates the upper end of a rotary cement kiln which terminates in the lower end of a precipitating tower 11. A conduit 12 conducts the gases from the upper end of tower 11 to the lower end of tower 13. A conduit 14 conducts the gases from tower 13 to a centrifugal fan or blower 15 which forces the same into the lower end of the precipitating tower 16. Another conduit 17 conducts the gases from the upper end of the tower 16 to the lower end of a tower 18. 41 is a gas outlet leading from the top of tower 18.

These towers may be of any suitable height. I have found that towers about 25 feet high give excellent results. They are circular in cross section, though they may be of any preferred shape and about 8 feet in diameter. Each tower is provided with a series of perforated baffle plates 19 horizontally arranged. These baffle plates are provided with perforations 20 of one-half inch in diameter and about one inch apart. A centrifugal pump 21 circulates a precipitating liquid which may be water or an aqueous mixture of compounds such as alkaline mixtures containing sodium, potassium, aluminum silicates, or a metal nitrid solution, or calcium sulfate and the like, suitable for collecting the cement dust and potassium compounds carried by the gases through pipe 22, leading to the top of the precipitating towers 11 and 13. Valved pipes 23 terminating in spray nozzles 24 in the tops of the towers 11 and 13 cause the liquid to flow down the towers and through the baffle plates in minute streams. A large portion of the potassium compounds ($K_2O$) and practically all the cement dust of the hot gases are precipitated by the liquid and form a magma or slurry which is collected in the bottoms of the towers 11 and 13. Outlets 25 lead from the bottom of the towers 11 and 13 to a tank 26 communicating with pipe 27 with the centrifugal pump 21.

A centrifugal pump 28 supplies towers 16 and 18 with a precipitating liquid by means of pipe 29 and branch pipes 30 terminating in spray nozzles 31 in the tops of said towers. Outlets 32 at the bottom of said towers conduct the liquid and precipitated matter to a collecting tank 33, communicating with pipe 34 with pump 28. A pipe 35 leads from pipe 22 to a filter press 36. 37 is a valve in pipe 35 and 38 is a valve in pipe 22. A valved pipe 39 leads from pipe 29 which latter is provided with a valve 40.

In the operation of the apparatus, the hot gases coming from the cement kiln pass through the towers 11 and 13 in series and practically all of the cement dust is precipitated therein. The gases are cooled from a temperature of approximately 1200° F. to about 212° F. and saturated with steam. It should be noted that the centrifugal pump or blower 15 sucks the gas through the towers 11 and 13 and forces them through towers 16 and 18 where the remaining portion of the potassium compounds are precipitated by the water flowing down the towers 16 and 18.

The first two precipitating towers 11 and 13 precipitate practically all the solid matter carried by the gases and approximately 50% of the potassium oxid. However, the percentage of the potassium oxid precipitated in these two towers may vary and depends upon the time factor, that is the length of time during which the gases are passed through the towers.

In the precipitating towers 16 and 18 on the other side of the centrifugal blower, the remaining portion of the potassium oxid is precipitated, and I preferably use acids such as sulfuric, hydrochloric, boric or nitric acids, forming the corresponding potassium salts, in place of water ordinarily used, which collects potassium compounds in the form of potassium hydroxid and potassium carbonate. It should be remembered that the hot gases carry large volumes of carbon dioxid which in the presence of moisture, combine with the potassium oxid to form potassium carbonate. If there are any sulfur compounds present in the hot gases coming from the cement kiln, which is the case where fuel oils containing sulfur compounds are used, such sulfur compounds form sulfuric acid and are precipitated in the first two towers 11 and 13, forming potassium sulfate, calcium sulfate and the like.

The advantage of the present process consists in the recovery of as high as 50% of potassium compounds carried by the hot gases of a cement kiln in the form of substantially pure salts, free from any cement dust.

It should be noted also that all the calcium, aluminum, magnesium and iron compounds normally present in the cement dust are caught and precipitated in the first two towers 11 and 13 and that as high as one-half of the potassium compounds are recovered in the form of a clear solution, which may be evaporated to dryness in any convenient manner.

I claim:
1. A process of recovering potassium compounds from hot gases carrying the same mixed with other materials in suspension, comprising passing said gases through a precipitating chamber, and causing the same to be contacted with a precipitating liquid whereby substantially all the solids carried by the gases and a portion of the potassium compounds are precipitated, forming a slurry, separating the potassium compounds from said slurry, passing the gases from the precipitating chamber into a second precipitating chamber, and causing said gases to come in contact with a precipitating solution, whereby substantially all the remaining portions of the potassium compounds are precipitated in the form of a clear solution.

2. A process of recovering potassium compounds from hot gases carrying the same mixed with other materials in suspension, comprising passing said gases through a precipitating chamber and causing the same to be contacted with a precipitating liquid whereby substantially all the solids carried by the gases and a portion of the potassium compounds are precipitated, forming a slurry, separating the potassium compounds from said slurry, passing the gases from the preciptating chamber, and causing them to come in contact with an acid capable of combining with potassium to form potassium salts, whereby substantially all the remaining portions of the potassium compounds are precipitated in the form of a clear potassium salt solution.

3. A process of recovering potassium compounds from hot gases carrying the same mixed with other materials in suspension, comprising passing said gases through a precipitating chamber and causing the same to be contacted with a precipitating liquid whereby substantially all the solids carried by the gases and a portion of the potassium compounds are precipitated, forming a slurry, separating the potassium compounds from said slurry, causing the gases from the precipitating chamber to come in contact with sulfuric acid, whereby substantially all the remaining portions of the potassium compounds are precipitated in the form of a clear potassium sulfate solution.

In testimony whereof I have signed my name to this specification.

HENRY BLUMENBERG, Jr.